United States Patent
Zeng et al.

(10) Patent No.: US 12,521,683 B2
(45) Date of Patent: Jan. 13, 2026

(54) REVERSE OSMOSIS COMPOSITE MEMBRANE WITH AN ULTRATHIN DESALTING LAYER AND PREPARATION METHOD THEREOF

(71) Applicant: Vontron Technology Co., Ltd., Guiyang (CN)

(72) Inventors: Huan Zeng, Guiyang (CN); Xindi Chen, Guiyang (CN); Xingsheng Yang, Guiyang (CN); Jun Fang, Guiyang (CN); Yuyang Guo, Guiyang (CN)

(73) Assignee: Vontron Technology Co., Ltd., Guiyang (CN)

( * ) Notice: Subject to any disclaimer, the term of this patent is extended or adjusted under 35 U.S.C. 154(b) by 301 days.

(21) Appl. No.: 18/257,230

(22) PCT Filed: Dec. 21, 2021

(86) PCT No.: PCT/CN2021/140077
§ 371 (c)(1),
(2) Date: Jun. 13, 2023

(87) PCT Pub. No.: WO2023/087481
PCT Pub. Date: May 25, 2023

(65) Prior Publication Data
US 2024/0091718 A1    Mar. 21, 2024

(30) Foreign Application Priority Data

Nov. 18, 2021   (CN) .......................... 202111371451.2

(51) Int. Cl.
| B01D 69/12 | (2006.01) |
| B01D 61/02 | (2006.01) |
| B01D 67/00 | (2006.01) |
| B01D 69/14 | (2006.01) |
| B01D 71/56 | (2006.01) |
| B01D 71/68 | (2006.01) |
| C02F 1/44  | (2023.01) |

(52) U.S. Cl.
CPC ....... *B01D 69/1251* (2022.08); *B01D 61/025* (2013.01); *B01D 67/0006* (2013.01); *B01D 67/0095* (2013.01); *B01D 69/14111* (2022.08); *B01D 71/56* (2013.01); *B01D 71/68* (2013.01); *C02F 1/441* (2013.01); *B01D 2323/38* (2013.01)

(58) Field of Classification Search
None
See application file for complete search history.

(56) References Cited

U.S. PATENT DOCUMENTS

| 6,159,370 A | 12/2000 | Hicke et al. |
| 9,943,811 B2 | 4/2018 | Perry et al. |
| 2007/0256969 A1 | 11/2007 | Ding et al. |
| 2010/0006495 A1* | 1/2010 | Buschmann ........... B01D 71/56 210/500.28 |
| 2011/0259817 A1 | 10/2011 | Mickols et al. |
| 2012/0273421 A1 | 11/2012 | Perry et al. |
| 2013/0015122 A1* | 1/2013 | Awadh .................. B82Y 30/00 427/601 |
| 2014/0299537 A1 | 10/2014 | Kim et al. |
| 2017/0274377 A1 | 9/2017 | Yang et al. |
| 2019/0193033 A1* | 6/2019 | Sahadevan ........... B01D 69/148 |
| 2022/0331744 A1 | 10/2022 | Hu et al. |

FOREIGN PATENT DOCUMENTS

| CN | 1145918 A | 3/1997 |
| CN | 1404906 A | 3/2003 |
| CN | 101524626 A | 9/2009 |
| CN | 101874989 A | 11/2010 |
| CN | 102348492 A | 2/2012 |
| CN | 102949938 A | 3/2013 |
| CN | 103962019 A | 8/2014 |
| CN | 104941461 A | 9/2015 |
| CN | 105792916 A | 7/2016 |
| CN | 105934271 A | 9/2016 |
| CN | 106232213 A | 12/2016 |

(Continued)

OTHER PUBLICATIONS

Co-pending International Application No. PCT/CN2021/140077, International Search Report dated Aug. 16, 2022 (10 pages) and English translation (2 pages).

Hu, Ruirui et al. "Graphene oxide-in-polymer nanofiltration membranes with enhanced permeability by interfacial polymerization", Journal of Membrane Science 564 (2018) 813-819.

Wu, M. et al. "Ultrathin nanofiltration membrane with polydopamine-covalent organic framework interlayer for enhanced permeability and structural stability", Journal of Membrane Science, 576 (2019) 131-141.

(Hu, Lijie et al.) Co-pending U.S. Appl. No. 17/634,675, filed Feb. 11, 2022, file history through Jan. 2025, 32 pages.

(Liang, Songmiao et al.) Co-pending U.S. Appl. No. 18/257,789, filed Jun. 15, 2023, specification, claims, and figures.

(Continued)

*Primary Examiner* — Krishnan S Menon
(74) *Attorney, Agent, or Firm* — New River Valley IP Law, P.C.; Ashley M. Gates; Michele L. Mayberry

(57) ABSTRACT

The present disclosure belongs to the technical field of porous membrane material preparation, and specifically relates to a reverse osmosis composite membrane with an ultrathin desalting layer and a preparation method thereof; the intermediate layer is introduced after modifying the polysulfone base membrane, the modified polysulfone base membrane support layer may strengthen the bonding to the desalting layer through a covalent bond, and the thickness of the desalting layer is reduced to be ≤10 nm, so that the desalination rate of the membrane is not greatly affected while increasing the membrane flux. Compared with the membrane having a conventional thickness of the desalting layer, the water flux of the reverse osmosis composite membrane with an ultrathin desalting layer may be increased by about 0.5 times, while the desalination rate has a small change.

13 Claims, No Drawings

(56) References Cited

FOREIGN PATENT DOCUMENTS

| | | | |
|---|---|---|---|
| CN | 106731908 A | 5/2017 |
| CN | 107126851 A | 9/2017 |
| CN | 107174969 A | 9/2017 |
| CN | 107899436 A | 4/2018 |
| CN | 108392992 A | 8/2018 |
| CN | 105435660 A | 9/2018 |
| CN | 109304099 A | 2/2019 |
| CN | 110394073 A | 11/2019 |
| CN | 111151137 A | 5/2020 |
| CN | 111659270 A | 9/2020 |
| CN | 112426894 A | 3/2021 |
| CN | 107743417 B | 8/2021 |
| EP | 3056260 A | 8/2016 |
| JP | 2002502692 A | 1/2002 |
| JP | 2006043655 A | 2/2006 |
| JP | 2018103097 A | 7/2018 |
| WO | 9940996 A1 | 8/1999 |
| WO | 2010082194 A2 | 7/2010 |
| WO | 2014168584 A1 | 10/2014 |
| WO | 2015044941 A1 | 4/2015 |
| WO | 2022127637 A1 | 6/2022 |
| WO | 2023087481 A1 | 5/2023 |

OTHER PUBLICATIONS

Co-pending U.S. Appl. No. 18/257,789, Preliminary amendment dated Sep. 13, 2023, 10 pages.

Co-pending International Application No. PCT/CN2019/120224, International Search Report and Written Opinion (8 pages) with English translation (7 pages).

Co-Pending International Application No. PCT/CN2021/135779, English Translation of the International Search Report and Written Opinion dated Mar. 1, 2022, 10 pages.

Co-pending International Application No. PCT/CN2021/140077, International Written Opinion dated Aug. 16, 2022 (3 pages) and English translation (4 pages).

Liu Chao-feng and Fang Shao-ming, "Progress in preparation techniques of nanofiltration membrane at home and abroad", Technology of Water Treatment, vol. 33, No. 6, Jun. 2007, 5 pages (including English Abstract).

Co-pending U.S. Appl. No. 18/257,789, Non-final office action dated Oct. 29, 2025, 10 pages.

Wilbert, M.C. et al., "Bench-scale testing of surfactant-modified reverse osmosis/nanofiltration membranes," Desalination 115 (1998) 15-32.

\* cited by examiner

REVERSE OSMOSIS COMPOSITE MEMBRANE WITH AN ULTRATHIN DESALTING LAYER AND PREPARATION METHOD THEREOF

TECHNICAL FIELD

The present disclosure belongs to the technical field of porous membrane material preparation, and specifically relates to a reverse osmosis composite membrane with an ultrathin desalting layer and a preparation method thereof.

BACKGROUND

The reverse osmosis membrane water treatment technology has the characteristics of integration and convenience. The reverse osmosis membrane material is the fundamental and core material of membrane technology in seawater desalination, and the performance of the reverse osmosis membrane material is the direct factor determining the technical and economic indexes of water treatment. Reducing energy consumption is the focus of continuous attention in the application process of this technology. Increasing flux may significantly reduce the energy consumption of the membrane under the same water treatment capacity. With the development of the market, the demand for continuously increasing flux has increasingly become a hot issue in the development of reverse osmosis composite membrane technology.

As the intrinsic characteristic parameter of the polyamide desalting layer material itself, the transmittance cannot be changed, so reducing the effective thickness of the desalting layer is an obvious way to improve the membrane flux. In order to prepare a high-performance reverse osmosis composite membrane, from the perspective of modifying the thickness of the functional layer, an ultrathin desalting layer was obtained by an interfacial polymerization reaction based on the intermediate layer formed on the surface of the base membrane. As a result, the length of the water channel in the functional layer of the membrane is reduced, which is beneficial to improving the water flux of the reverse osmosis composite membrane.

The patent document with application number CN202110114270.5 discloses a preparation method of polyamide composite reverse osmosis membrane and the reverse osmosis membrane obtained therefor, wherein a flexible chain crosslinked carbon quantum nano-porous layer is provided on a polysulfone support layer as an interfacial polymerization control layer, and finally a functional layer is prepared. The interfacial polymerization control layer is formed by crosslinking and fixing aminated carbon atoms with a flexible chain crosslinking agent, which may regulate the interfacial polymerization process and serve as an effective water channel after membrane formation; the formed aromatic polyamide layer is ultrathin and dense, and the water flux and the desalination rate of the membrane material are simultaneously improved.

Moreover, literatures such as the Journal of Membrane Science 576 (2019) 131-141, and the Journal of Membrane Science 564 (2018) 813-819 have also reported the introduction of an intermediate layer between the base membrane and the functional layer during the film covering process. From the above patents and literatures, it is known that introducing an intermediate layer to control the conditions of interfacial polymerization reaction before the desalting layer is obtained by coating a film on a support layer has been studied. However, the thickness of the functional layer prepared in the prior art is not ideal, or the thickness and functionality of the functional layer cannot be achieved at the same time.

SUMMARY

The present disclosure provides a reverse osmosis composite membrane with an ultrathin desalting layer and a preparation method thereof for solving the above problems.

Specifically, it is realized through the following technical solutions:

1. A reverse osmosis composite membrane with an ultrathin desalting layer, wherein the reverse osmosis composite membrane is composed of a non-woven fabric, a modified polysulfone base membrane support layer, an intermediate layer, and a desalting layer.

Further, the modified polysulfone base membrane support layer is obtained by carrying out graft modification treatment on a polysulfone base membrane by using a chlorosulfonic acid solution with a concentration of 10 wt. % to 99 wt. %.

Further, it is found through SEM photo detection that the average pore diameter of the polysulfone base membrane is 10 to 50 nm.

Further, the intermediate layer is formed by vacuum filtering a metal hydroxide nanowire solution and stacking it on the surface of the modified polysulfone base membrane support layer. It is found through SEM photo detection that the thickness of the intermediate layer is 1 to 10 μm.

Further, the desalting layer is obtained through an interfacial polymerization reaction by taking polyamines as water phase monomer and polyacyl chlorides as oil phase monomer and is compounded on the polysulfone base membrane support layer. It is found through SEM photo detection that the thickness of the desalting layer is ≤10 nm.

2. The method for preparing the metal hydroxide nanowire solution is as follows:
   (1) dissolving a soluble metal salt in deionized water to form a solution with a concentration of 1 to 10 wt. %, then adding an alkali or ammonia solution to regulate pH value to 10-14, and stirring to generate a metal hydroxide precipitate;
   (2) centrifuging and washing the hydroxide precipitate until the pH value is neutral, redispersing the precipitate in deionized water, adding 1 to 10 g of soluble metal salt corresponding to the soluble metal salt in step (1), and carrying out a hydrothermal reaction in a closed container at a temperature of 200 to 250° C. under normal pressure for 10 to 15 hours to obtain a metal hydroxide nanowire solution.

Further, the soluble metal salt is any one of cadmium chloride, barium chloride, strontium chloride, and zinc chloride.

3. A method for preparing the above reverse osmosis composite membrane with an ultrathin desalting layer, specifically comprising the following steps:
   (1) a base membrane modification: soaking a polysulfone base membrane in a chlorosulfonic acid solution for 1 to 24 hours, wherein a ratio of the polysulfone base membrane to the chlorosulfonic acid solution is 20 cm$^2$:1 L, and the concentration of the chlorosulfonic acid solution is 10 wt. % to 99 wt. %; and adding a palladium catalyst in an amount of 2 g/L into the solution, washing with ultrapure water after soaking, and airing to obtain a modified polysulfone base membrane support layer;

(2) an intermediate layer formation: vacuum filtering a metal hydroxide nanowire solution and stacking on a surface of the modified polysulfone base membrane support layer, and compacting;
  further, the metal hydroxide nanowire is any one of cadmium hydroxide, barium hydroxide, strontium hydroxide, and zinc hydroxide, and the concentration of the hydroxide is 1 to 10 wt. %;
(3) a desalting layer formation: immersing the modified polysulfone base membrane support layer covered with the intermediate layer into an aqueous phase solution containing polyamines for 5 to 300 seconds, taking out, removing water droplets from the surface, and then immersing into an oil phase solution containing polyacyl chlorides for 5 to 300 seconds to form a polyamide desalting layer;
  further, the aqueous phase solution is one or more of m-phenylenediamine, p-phenylenediamine, ethylene diamine, and piperazine, and the concentration of the aqueous phase solution is 3 to 5 wt. %.

Further, the oil phase solution is one or more of benzene-tricarbonyl chloride, terephthaloyl chloride, and oxalyl chloride, and the concentration of the oil phase solution is 0.15 to 0.25 wt. %.

Further, the solvent of the oil phase solution is one or more of dichloromethane, chloroform, dichloroethane, n-hexane, ethyl cyclohexane, propylene oxide, and the like.

(4) A finished membrane preparation: carrying out surface drying heat treatment on the modified polysulfone base membrane support layer that has formed the desalting layer at the temperature of 50 to 70° C. for 1 to 10 minutes to obtain a reverse osmosis composite membrane with an ultrathin desalting layer.

To sum up, the beneficial effects of the present disclosure are as follows: the intermediate layer is introduced after the polysulfone base membrane is modified, and the modified polysulfone base membrane support layer may strengthen the bonding to the desalting layer through a covalent bond, and the thickness of the desalting layer is reduced so that the desalination rate of the membrane is not greatly affected while the membrane flux is increased. Compared with the membrane having a conventional thickness of the desalting layer, the water flux of the reverse osmosis composite membrane with an ultrathin desalting layer may be increased by about 0.5 times and the desalination rate has a small change.

The introduction of an intermediate layer may change the solvent environment in the miscible zone of the reaction between water-phase monomer and oil-phase monomer in the process of interfacial polymerization, thereby obtaining an ultrathin desalting layer. This is because only the water phase introduced into the intermediate layer may participate in the formation of the miscible zone in the interfacial polymerization process, and the intermediate layer formed by stacking the metal hydroxide nanowires on the surface of the base membrane through vacuum filtration and compaction may be removed by the generated hydrogen chloride neutralization reaction while the interfacial polymerization reaction proceeds. Therefore, it is apparent that the amount of aqueous phase in the intermediate layer transferred to the miscible zone is limited, and the amount of aqueous phase monomer involved in the interfacial polymerization to form the functional layer is small. To sum up, the interfacial polymerization initially formed a very thin polyamide functional layer, and the as-formed membrane was fixed and no longer thickened, resulting in the composite membrane with an ultrathin desalting layer structure.

Since the introduction of an intermediate layer may weaken the bond between the base membrane and the desalting layer, sulfonyl chloride group grafting is carried out on a polysulfone benzene ring of a base membrane in the present disclosure to increase the flux of the reverse osmosis composite membrane and ensure a higher desalination rate, so that when the desalting layer is formed by the interfacial polymerization of water-phase monomer polyanilines and oil-phase monomer polyacyl chlorides, part of water-phase monomer polyanilines reacts with the sulfonyl chloride groups on the surface of the groups, so as to realize the strengthened bonding between the base membrane and the desalting layer by a covalent bond. This ensures the strength of the functional layer on the composite membrane so that the desalination rate of the membrane is not greatly affected while the membrane flux is increased. However, the introduction of a sacrificial intermediate layer is just a means, and the preparation of an ultrathin functional layer with a thickness of ≤10 nm by using the sacrificial intermediate layer is the core content of the present disclosure, and on this basis, a base membrane support layer modification process is introduced to ensure the bonding strength between the functional layer and the support layer.

The polyamide functional layer (i.e., desalting layer) of the reverse osmosis composite membrane prepared by the method according to the present disclosure may have a thickness of ≤10 nm. Compared with the membrane having a polyamide functional layer of conventional thickness, it is found that when the membrane runs under the conditions of 1500 ppm NaCl aqueous solution and the operating pressure of 0.70 MPa (concentrated water cycle), the water flux increases from about 42 gfd to about 60 gfd, which is increased by about 0.5 times, and the desalination rate only decreases from 99.2% to 98.8%. Under the condition of water efficiency: a water efficiency solution is prepared by adding 11.10 g of $CaCl_2$, 10.75 g of $NaHCO_3$, and 2.00 g of NaCl into 40 L of pure water, respectively, and then adding 40 ml of the hypochlorous acid solution diluted in proportion of 6 to 8 ml hypochlorous acid dissolved in 1 L of pure water, when the membrane runs under the operating pressure of 0.70 MPa (concentrated water cycle), the water flux increases from about 36 gfd to about 56 gfd, which is also increased by about 0.5 times, and the desalination rate only decreases from 96.2% to 95.0%.

Furthermore, the bonding strength between the base membrane and the desalting layer of the reverse osmosis composite membrane prepared by the method according to the present disclosure is substantially consistent with that of the reverse osmosis composite membrane prepared by a conventional method. The method for characterizing the bonding strength between the base membrane and the desalting layer is to measure the peel strength (or called average peel force) of the membrane, which represents the force applied when the base membrane and the desalting layer are continuously peeled at 180° when the width dimension is fixed. However, the peel strength of the membrane prepared by the method according to the present disclosure and that of the conventional membrane are changed within the range of 0.3N to 0.5N, both belong to the range of better bonding strength between the base membrane and the desalination layer. In comparison, the water flux of the membrane prepared by the method according to the present disclosure has a greater improvement effect, and this technology is expected to be applied to mass production of reverse osmosis membranes and is easy to carry out factory production.

DETAILED DESCRIPTION

Specific embodiments of the present disclosure are described in further detail below, but the present disclosure is not limited to these embodiments. Any improvement or substitution in the essential spirit of the present examples is still within the scope of protection claimed by the claims of the present disclosure.

I. EXAMPLES AND COMPARATIVE EXAMPLES

Example 1

1. A reverse osmosis composite membrane with an ultrathin desalting layer, which was composed of a nonwoven fabric, a modified polysulfone base membrane support layer, an intermediate layer, and a desalting layer.

Further, it is found through SEM photo detection that the average pore diameter of the polysulfone base membrane was 10 nm.

Further, the intermediate layer was formed by vacuum filtering a metal hydroxide nanowire solution and stacking on a surface of the modified polysulfone base membrane support layer.

2. The method for preparing the metal hydroxide nanowire solution was as follows:
  (1) cadmium chloride was dissolved in deionized water to form a solution with a concentration of 10 wt. %, then an ammonia solution was slowly added to regulate pH value to 14 and the solution was stirred to generate cadmium hydroxide precipitate;
  (2) the cadmium hydroxide precipitate was centrifuged and washed until the pH value was neutral, the precipitate was redispersed in deionized water, proper amount of inorganic salt cadmium chloride was added, and a hydrothermal reaction was carried out in a closed container at 200° C. for 10 hours to obtain cadmium hydroxide nanowire solution with a concentration of 5 wt. %.

3. A method for preparing the above reverse osmosis composite membrane with an ultrathin desalting layer specifically comprised the following steps:
  (1) a base membrane modification: a polysulfone base membrane (10 cm×10 cm) was soaked in 5 L of the chlorosulfonic acid solution for 2 hours, wherein the concentration of the chlorosulfonic acid solution was 50 wt. %, and a palladium catalyst was added in an amount of 10 g into the solution, the resultant was washed with ultrapure water after soaking and aired to obtain a modified polysulfone base membrane support layer;
  (2) an intermediate layer formation: vacuum filtering the cadmium hydroxide nanowire solution and stacking on a surface of the modified polysulfone base membrane support layer, and compacting, and the thickness of the intermediate layer was 2 μm;
  (3) a desalting layer formation: the modified polysulfone base membrane support layer covered with the intermediate layer was immersed into an aqueous phase solution containing 3.0 wt. % m-phenylenediamine for 20 seconds, and then taken out, water droplets were removed from the surface, and then it was immersed into an oil phase solution containing 0.15 wt. % trimesoyl chloride for 20 seconds to form a polyamide desalting layer. Further, the aqueous phase solution contained camphorsulfonic acid with a concentration of 4 wt. % and triethylamine with a concentration of 2 wt. %. Further, the solvent of the oil phase solution was ethyl cyclohexane.
  (4) a finished membrane preparation: a heat treatment was carried out on the modified polysulfone base membrane support layer which has formed the desalting layer at the temperature of 70° C. for 5 minutes to obtain a reverse osmosis composite membrane with an ultrathin desalting layer.

Example 2

The preparation method was the same as that in Example 1, except that in the base membrane modification step, the polysulfone base membrane was soaked in 75% chlorosulfonic acid solution for 2 hours, a palladium catalyst was added into the solution, and the modified polysulfone base membrane support layer was obtained by washing with ultrapure water and airing after soaking. Other preparation steps and conditions were completely the same as that of Example 1 and were not described in detail.

Example 3

The preparation method was the same as that in Example 1, except that barium hydroxide nanowires were vacuum filtered and stacked on the modified polysulfone base membrane support layer, wherein the preparation method of the barium hydroxide nanowire solution was similar to that of the cadmium hydroxide nanowire solution. Other preparation steps and conditions were completely the same as that of Example 1 and were not described in detail.

Comparative Example 1

A reverse osmosis composite membrane was prepared using the method of Example 1, except that the base membrane was not modified by immersing in a chlorosulfonic acid solution, and no metal hydroxide nanowire intermediate layer was introduced.

II. MEMBRANE PERFORMANCE TESTS 2.1 Experimental Materials

Reverse osmosis composite membranes prepared by the methods of Examples 1 to 3 and Comparative Example 1 were adopted.

2.2 Experimental Method

The membranes were tested for desalination rate and flux with 1500 ppm aqueous NaCl solution at an operating pressure of 0.70 MPa and a temperature of 25° C. and the results were shown in Table 1 (concentrated water cycle).

The membranes were tested for desalination rate and flux using a water efficiency solution at an operating pressure of 0.70 MPa and a temperature of 25° C. and the results were shown in Table 2 (concentrated water cycle).

The preparation method of the water efficiency solution was as follows: 11.10 g of $CaCl_2$, 10.75 g of $NaHCO_3$, and 2.00 g of NaCl were respectively added into 40 L of pure water, and then 40 ml of hypochlorous acid solution diluted in proportion of 6 to 8 ml of hypochlorous acid dissolved in 1 L of pure water was added.

2.3 Experimental Results

TABLE 1

| | | Experiment | | | | |
| --- | --- | --- | --- | --- | --- | --- |
| | | Initial | 100 h | 200 h | 300 h | 400 h |
| Comparative Example | Rejection (%) | 99.2 | 99.4 | 99.4 | 99.4 | 99.3 |
| | Water flux (GFD) | 42.1 | 42.0 | 42.0 | 41.5 | 41.5 |
| Example 1 | Rejection (%) | 98.7 | 98.5 | 98.7 | 98.6 | 98.5 |
| | Water flux (GFD) | 62.3 | 62.1 | 61.5 | 60.9 | 60.2 |

TABLE 1-continued

|  |  | Experiment | | | | |
| --- | --- | --- | --- | --- | --- | --- |
|  |  | Initial | 100 h | 200 h | 300 h | 400 h |
| Example 2 | Rejection (%) | 98.4 | 98.2 | 98.4 | 98.5 | 98.6 |
|  | Water flux (GFD) | 60.1 | 59.8 | 60.0 | 60.0 | 60.0 |
| Example 3 | Rejection (%) | 98.5 | 98.5 | 98.6 | 98.8 | 99.0 |
|  | Water flux (GFD) | 65.0 | 64.5 | 64.5 | 64.0 | 63.5 |

TABLE 2

|  |  | Experiment | | | | |
| --- | --- | --- | --- | --- | --- | --- |
|  |  | Initial | 5 h | 10 h | 15 h | 20 h |
| Comparative | Rejection (%) | 96.2 | 96.3 | 96.5 | 97.0 | 97.5 |
| Example | Water flux (GFD) | 36.0 | 34.0 | 32.0 | 30.0 | 28.0 |
| Example 1 | Rejection (%) | 95.0 | 95.2 | 95.3 | 95.6 | 95.9 |
|  | Water flux (GFD) | 56.0 | 54.0 | 51.8 | 50.0 | 47.6 |
| Example 2 | Rejection (%) | 95.2 | 95.6 | 95.8 | 96.5 | 96.8 |
|  | Water flux (GFD) | 55.8 | 53.0 | 50.4 | 48.0 | 46.0 |
| Example 3 | Rejection (%) | 95.6 | 95.6 | 95.8 | 96.2 | 96.5 |
|  | Water flux (GFD) | 55.2 | 53.0 | 51.0 | 48.2 | 45.8 |

From the experimental results in Table 1 and Table 2, it can be seen that the reverse osmosis composite membranes with an ultrathin desalting layer prepared by the method according to the present disclosure in Example 1, Example 2, and Example 3 respectively had significantly increased flux and almost no change in desalination rate no matter whether they were running in NaCl solution or water efficiency solution. Under the condition of the long-term running, the desalination rate of the membranes ran in NaCl solution was slightly increased, while the flux was stable; the desalination rate of the membranes ran in the water efficiency solution was also slightly increased, and the flux decreased rapidly. However, under the condition of the water efficiency running, the membranes of Examples 1, 2, 3, and Comparative Example 1 all maintained the same flux decay trend, and the flux of the membranes of Examples 1, 2, and 3 was always higher than that of Comparative Example 1.

That is, a high-performance reverse osmosis composite membrane with an ultrathin desalting layer may be prepared by adopting the method within the scope of the claims according to the present disclosure; the thickness of the functional layer of the membrane was thinner. Compared with a membrane with a desalting layer having a conventional thickness, the water flux of the membrane according to the present disclosure may be increased by about 0.5 times, and the desalination rate had a small change.

What is claimed is:

1. A reverse osmosis composite membrane with an ultrathin desalting layer, wherein the reverse osmosis composite membrane is composed of a non-woven fabric, a modified polysulfone base membrane support layer, an intermediate layer, and a desalting layer; wherein the intermediate layer is formed by vacuum filtering a metal hydroxide nanowire solution and stacking on a surface of the modified polysulfone base membrane support layer, and the intermediate layer has a thickness of 1 to 10 μm; the desalting layer is obtained through an interfacial polymerization reaction by taking polyamines as water phase monomer and polyacyl chlorides as oil phase monomer and is compounded on the polysulfone base membrane support layer, and the desalting layer has a thickness of ≤10 nm.

2. The reverse osmosis composite membrane with an ultrathin desalting layer according to claim 1, wherein the modified polysulfone base membrane support layer is obtained by carrying out graft modification treatment on a polysulfone base membrane by using a chlorosulfonic acid solution with a concentration of 10 wt. % to 99 wt. %.

3. A method for preparing a reverse osmosis composite membrane with an ultrathin desalting layer, comprising the following steps:
   (1) a base membrane modification: soaking a polysulfone base membrane in a chlorosulfonic acid solution for 1 to 24 hours, wherein a ratio of the polysulfone base membrane to the chlorosulfonic acid solution is 20 cm$^2$:1 L; and adding a palladium catalyst in an amount of 2 g/L into the solution, washing with ultrapure water after soaking, and airing to obtain a modified polysulfone base membrane support layer;
   (2) an intermediate layer formation: vacuum filtering a metal hydroxide nanowire solution and stacking on a surface of the modified polysulfone base membrane support layer, and compacting;
   (3) a desalting layer formation: immersing the modified polysulfone base membrane support layer covered with the intermediate layer into an aqueous phase solution containing polyamines for 5 to 300 seconds, taking out, removing water droplets from the surface, and then immersing into an oil phase solution containing polyacyl chlorides for 5 to 300 seconds to form a polyamide desalting layer;
   (4) a finished membrane preparation: carrying out a surface drying heat treatment on the modified polysulfone base membrane support layer that has formed the desalting layer at a temperature of 50 to 70° C. for 1 to 10 minutes to obtain a reverse osmosis composite membrane with an ultrathin desalting layer.

4. The method for preparing a reverse osmosis composite membrane with an ultrathin desalting layer according to claim 3, wherein the chlorosulfonic acid solution has a concentration of 10 wt. % to 99 wt. %.

5. The method for preparing a reverse osmosis composite membrane with an ultrathin desalting layer according to claim 3, wherein the metal hydroxide nanowire is any one of cadmium hydroxide, barium hydroxide, strontium hydroxide, and zinc hydroxide, and the concentration of the hydroxide is 1 to 10 wt. %.

6. The method for preparing a reverse osmosis composite membrane with an ultrathin desalting layer according to claim 3, wherein the aqueous phase solution is one or more of m-phenylenediamine, p-phenylenediamine, ethylene diamine, and piperazine, and the concentration of the aqueous phase solution is 3 to 5 wt. %.

7. The method for preparing a reverse osmosis composite membrane with an ultrathin desalting layer according to claim 3, wherein the oil phase solution is one or more of benzenetricarbonyl chloride, terephthaloyl chloride, and oxalyl chloride, and the concentration of the oil phase solution is 0.15 to 0.25 wt. %.

8. The method for preparing a reverse osmosis composite membrane with an ultrathin desalting layer according to claim 3, wherein a method for preparing the metal hydroxide nanowire solution is as follows:
   (1) dissolving a soluble metal salt in deionized water to form a solution with a concentration of 1 to 10 wt. %, then adding an alkali or ammonia solution to regulate pH value to 10-14, and stirring to generate a metal hydroxide precipitate;
   (2) centrifuging and washing the hydroxide precipitate until the pH value is neutral, redispersing the precipitate in deionized water, adding 1 to 10 g of soluble metal salt corresponding to the soluble metal salt in step (1), and carrying out a hydrothermal reaction in a closed container to obtain a metal hydroxide nanowire solution.

9. The method for preparing a reverse osmosis composite membrane with an ultrathin desalting layer according to claim 8, wherein the soluble metal salt is any one of cadmium chloride, barium chloride, strontium chloride, and zinc chloride.

10. The method for preparing a reverse osmosis composite membrane with an ultrathin desalting layer according to claim 8, wherein the hydrothermal reaction is carried out for 10 to 15 hours at a temperature of 200 to 250° C. under normal pressure.

11. The method for preparing a reverse osmosis composite membrane with an ultrathin desalting layer according to claim 5, wherein a method for preparing the metal hydroxide nanowire solution is as follows:
   (1) dissolving a soluble metal salt in deionized water to form a solution with a concentration of 1 to 10 wt. %, then adding an alkali or ammonia solution to regulate pH value to 10-14, and stirring to generate a metal hydroxide precipitate;
   (2) centrifuging and washing the hydroxide precipitate until the pH value is neutral, redispersing the precipitate in deionized water, adding 1 to 10 g of soluble metal salt corresponding to the soluble metal salt in step (1), and carrying out a hydrothermal reaction in a closed container to obtain a metal hydroxide nanowire solution.

12. The method for preparing a reverse osmosis composite membrane with an ultrathin desalting layer according to claim 11, wherein the soluble metal salt is any one of cadmium chloride, barium chloride, strontium chloride, and zinc chloride.

13. The method for preparing a reverse osmosis composite membrane with an ultrathin desalting layer according to claim 11, wherein the hydrothermal reaction is carried out for 10 to 15 hours at a temperature of 200 to 250° C. under normal pressure.

* * * * *